United States Patent [19]

Gupta

[11] Patent Number: 4,863,416
[45] Date of Patent: Sep. 5, 1989

[54] MISALIGNMENT ACCOMMODATING COMPOSITE SHAFT

[75] Inventor: Bhagwati P. Gupta, Erie, Pa.

[73] Assignee: Lord Corporation, Erie, Pa.

[21] Appl. No.: 133,743

[22] Filed: Dec. 16, 1987

Related U.S. Application Data

[63] Continuation-in-part of Ser. No. 766,258, Aug. 16, 1985, abandoned.

[51] Int. Cl.4 ............................................. F16C 1/02
[52] U.S. Cl. ..................................... 464/181; 464/183
[58] Field of Search ................. 138/130; 464/181, 183

[56] References Cited

U.S. PATENT DOCUMENTS

| | | | |
|---|---|---|---|
| Re. 31,047 | 10/1982 | Ross | 138/130 |
| 3,628,352 | 12/1971 | Stuemky | 464/88 X |
| 3,791,898 | 2/1974 | Remi | 156/143 |
| 3,921,674 | 11/1975 | Logan et al. | 138/130 |
| 4,013,101 | 3/1977 | Logan et al. | 138/130 |
| 4,023,834 | 5/1977 | Ewing et al. | 285/235 |
| 4,023,835 | 5/1977 | Ewing et al. | 285/235 |
| 4,089,190 | 5/1978 | Worgan et al. | 464/181 X |
| 4,171,626 | 10/1979 | Yates et al. | 464/181 |
| 4,173,128 | 11/1979 | Corvelli | 464/183 X |
| 4,178,001 | 12/1979 | Stanley et al. | 277/152 |
| 4,186,696 | 2/1980 | Linsenmann | 123/90.61 |
| 4,238,539 | 12/1980 | Yates et al. | 428/36 |
| 4,238,540 | 12/1980 | Yates et al. | 464/181 X |
| 4,248,062 | 2/1981 | McLain et al. | 464/181 |
| 4,421,497 | 12/1983 | Federmann et al. | 464/181 |
| 4,664,644 | 5/1987 | Kumata et al. | 464/181 X |
| 4,666,372 | 5/1987 | Avila et al. | 416/134 A |
| 4,758,204 | 7/1988 | Lindgren | 464/181 |

OTHER PUBLICATIONS

"Filament Winding: Its Development, Manufacture, Applications, and Design", D. V. Rosato and C. S. Grove, Jr., p. 178.

"A Torsionally Stiff—Bending Soft Driveshaft", A. J. Hannibal and J. A. Avila, Jan. 16–19, 1984.

*Primary Examiner*—Daniel P. Stodola
*Attorney, Agent, or Firm*—Philip P. McCann; James W. Wright

[57] ABSTRACT

A composite elongate shaft member useful in transmitting torque between axially spaced couplings rotatable about axes that may be misaligned. The member includes a series of bags of overlapped anisotropic layers each comprising parallel filaments bonded together in a matrix. The filaments in each layer pair are disposed at a predetermined lay angle with respect to the longitudinal axis of the shaft member with the lay angles in adjacent layers of each pair being substantially equal in magnitude but opposite in direction. A desirable ratio of torsional stiffness to bending stiffness is provided while minimizing bending stresses in the member by disposing the filaments at a predetermined angle which is selected in relation to the stiffness of the matrix material to cause the strain in the circumferential direction of the member to be substantially equal to the strain in the radial direction when the member is subjected to axial strain.

12 Claims, 6 Drawing Sheets

MISALIGNMENT ACCOMMODATING COMPOSITE SHAFT

CROSS-REFERENCE TO RELATED APPLICATION

The present application is a continuation-in-part of copending application Ser. No. 766,258, filed on Aug. 16, 1986, entitled "Composite Member Wound At Optimized Angles", now abandoned.

FIELD OF THE INVENTION

The present invention relates to drive shafts, and more particularly, the present invention relates to drive shafts of filament wound composite construction capable of transmitting torque between spaced couplings rotatable about axes that may be misaligned.

BACKGROUND OF THE INVENTION

Drive shafts of composite construction are well known. Composite drive shafts find particular utility in those applications requiring a strong but lightweight member to transmit torque between spaced apart couplings. Such shafts are particularly desirable desirable in modern aircraft and automobile power train applications.

A conventional composite drive shaft is of tubular construction and generally includes a series of layers of parallel filaments bonded together in a matrix and disposed at a predetermined lay angle with respect to the longitudinal axis of the shaft. The shaft is formed by coating the filaments with a bonding agent, wrapping the same about a mandrel at the desired lay angle and subsequently removing the mandrel. The lay angle is of substantially the same magnitude in each layer but is of opposite direction so that the filaments in adjacent layers cross one another. Preferably, the filaments are of so-called high strength materials such as glass, carbon, polyamide, and the like. The matrix material binding the filaments together may be of a relatively stiff material, such as epoxy, or of a more flexible material, such as polyurethane.

In designing composite shafts, the designer is faced with certain trade-offs. For instance, it is known that torsional stiffness is maximized when the filament lay angle is relatively large, but in such event, the bending stiffness is relatively low. At relatively small lay angles, the bending stiffness increases, but the torsional stiffness decreases. To accommodate these considerations, it has been conventional practice to construct composite shafts having filament lay angles of 45 degrees. One or more other factors can then be varied to achieve the desired design goals, such as varying the dimensions of the shaft, the stiffness of the filaments or the matrix material.

Certain problems are encountered in designing a satisfactory composite shaft capable of meeting the requirements of both transmitting substantial torque and accommodating the bending deflections caused by misaligned end couplings. For instance, such a shaft should have a relatively high torsional stiffness to bending stiffness ratio but should have minimal bending stresses in order to accommodate size and weight considerations. Attempts to solve this problem by utilizing so-called low modulus elastomeric bonding agents, such as polyurethane, with filaments disposed at conventional 45 degree lay angles provide the desired stiffness ratio; however, the bending stress in the resulting shaft structure is significantly higher than desired, thereby reducing the torque transmission capacity of a shaft of a given size and weight. Accordingly, there is a need for a filament wound composite shaft which is torsionally stiff yet sufficiently flexible to accommodate endwise misalignments while being light in weight and durable.

OBJECTS OF THE INVENTION

With the foregoing in mind, a primary object of the present invention is to provide an improved composite drive shaft which overcomes the limitations of known composite drive shafts.

Another object of the present invention is to provide a novel composite shaft having a desirable ratio of torsional stiffness to bending stiffness with minimum bending stress.

A further object of the present invention is to provide a durable, lightweight, filament wound composite shaft which is torsionally stiff and relatively flexible.

A still further object of the present invention is to provide a composite shaft which is torsionally stiff, flexible, light in weight, and durable, yet which can be manufactured readily utilizing conventional winding equipment and techniques.

SUMMARY OF THE INVENTION

More specifically, the present invention provides an elongate composite shaft member for use in transmitting torque between spaced coupling elements rotatable about axes that may be misaligned. The member includes a series of layers overlapped circumferentially about a longitudinal axis with each layer comprising substantially parallel filaments bonded together in a matrix. The filaments in the layers are disposed at a predetermined lay angle with respect to the longitudinal axis of the member with the lay angle of the filaments in adjacent layers being substantially equal in magnitude but opposite in direction so that the filaments in adjacent layers cross one another. The lay angle is preferably in a range of between about 55 degrees to about 65 degrees and is specifically selected in relation to the stiffness of the matrix material to ensure that the strain in the member in the circumferential direction is substantially equal to the strain in the member in the radial direction when the member is subjected to strain in the axial direction. The bending stress in the composite member is thereby minimized without adversely affecting the ratio of torsional stiffness to bending stiffness of the member.

BRIEF DESCRIPTION OF THE DRAWINGS

The foregoing and other objects, features and advantages of the present invention should become apparent from the following description, when taken in conjunction with the accompanying drawings, in which.

DESCRIPTION OF THE PREFERRED EMBODIMENT

Figure 1:
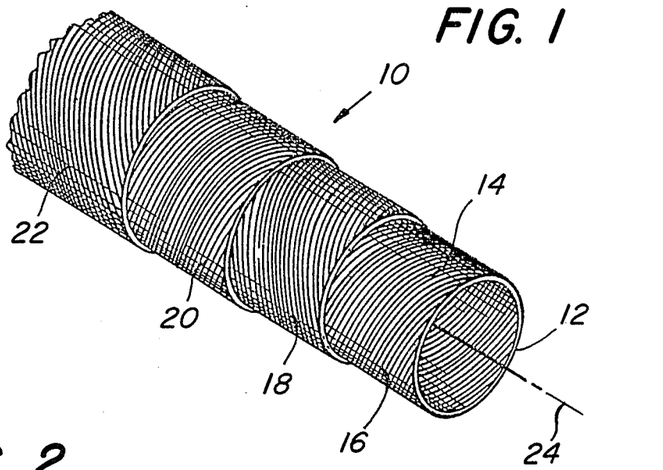
FIG. 1 is a fragmentary perspective view of a filament wound composite shaft which embodies the present invention.

Referring now to the drawings, FIG. 1 illustrates a fragmentary perspective view of a portion of a composite drive shaft 10 which embodies the present invention. The drive shaft 10 comprises a series of layers, such as the layers 16, 18, 20 and 22 extending circumferentially about an elongate axis 24. In the illustrated embodiment, the various layers are peeled back for purposes of illustration only, it being understood that in an actual shaft, the layers will completely overlap one another.

Each layer, such as the innermost layer 16, comprises a plurality of endless filaments 14 extending in substantially parallel relation and bonded together in that relation in the layer 16 by a particular matrix material 12. The inner layer 16 is formed by wrapping filaments 14 coated with the matrix material 12 abot a rotatable mandrel and subsequently removing the mandrel. The filaments 14 in the innermost layer 16 are initially wrapped at a predetermined lay angle with respect to the axis 24, and the filaments in the immediately adjacent overlapping layer 18 are wrapped at a lay angle of the same magnitude but opposite in direction so that the filaments cross one another in adjacent layers and thereby form a pair of layers, such as the pair 16 and 18 and the pair 20 and 22. In the illustrated embodiment, the filaments in the first and third layers, such as 16 and 20 are disposed at the same lay angle as are the filaments in the layers 18 and 22, respectively. However, there may be certain applications in which it may be desirable for the lay angle of the filaments in the pair of layers 16 and 18 to be different from the lay angle of the pair of layers 20 and 22.

Figure 2:
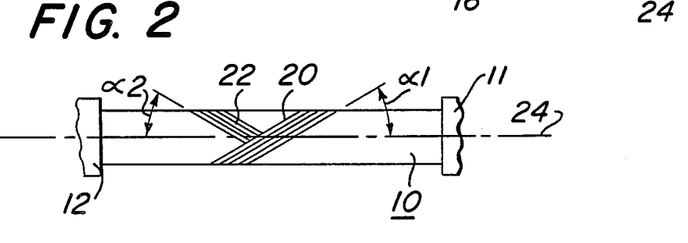
FIG. 2 is a side elevational view, in reduced scale, of the shaft of FIG. 1 shown connecting a pair of spaced coupling elements rotatable coaxial with one another.

As best seen in FIG. 2, the filaments in the outermost layer 20 are laid at an angle $\alpha_1$ with respect to the longitudinal axis 24 of the shaft 10. The filaments, in the adjacent underlying layer 22, are wrapped at an angle $\alpha_2$ with respect to the longitudinal axis 24. It has been conventional practice, as discussed heretofore, to dispose the filaments at angles $\alpha_1$ and $\alpha_2$ of 45 degrees each. Thus, when the shaft 10 is connected at opposite ends to coupling elements 11 and 12 which are rotatable about the axis 24, a desirable ratio of torsional stiffness to bending stiffness can be obtained.

Figure 3:
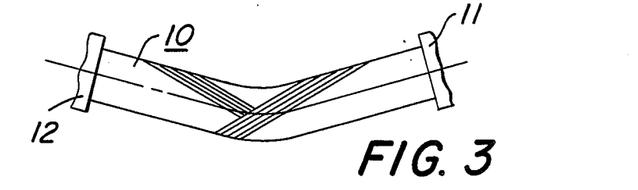
FIG. 3 is a view, similar to FIG. 2, but illustrating the shaft bowed in a greatly exaggerated manner between the pair of coupling elements when rotated about misaligned intersecting axes.

In conventional filament wound composite shafts, the filaments are preferably selected of so-called high modulus materials, such as carbon, boron, glass, graphite, polyamide, and steel. The matrix materials may be of relatively stiff composition, such as epoxy having a Young's modulus above about 100,000 psi. and as high as about 500,000 psi.; or, the matrix material may be of a flexible material, such as polyurethane, having a Young's modulus of less than about 100,000 psi. Hollow drive shafts fabricated of the same type filaments, but utilizing an epoxy matrix material, have relatively small ratios of torsional stiffness to bending stiffness, i.e. of about 5:1. Shafts of the same type filaments, but having a urethane matrix, however, have significantly larger ratios, i.e. on the order of about 100,000:1. Large ratios are desirable to accommodate significant misalignment between end couplings such as the couplings 11 and 12 illustrated in greatly exaggerated manner in FIG. 3; however, heretofore, it has not been possible to produce such a shaft in a manner which minimizes bending stresses.

The present invention provides a composite shaft having a desirable torsional to bending stiffness ratio while minimizing bending stresses in the shaft. To this end, Applicant has determined that such a shaft can be constructed provided certain critical relations are observed. Of particular significance is the winding angle of the filaments in relation to the Young's modulus of the matrix material which bonds the filaments together in each layer and the layers to one another. For example, when the matrix materials are of low-modulus composition, such as polyurethanes having a Young's modulus of less than about 100,000 psi., the winding angles $\alpha_1$ and $\alpha_2$ of the filaments should be in a range of about 55 degrees to about 60 degrees. When the composition of the matrix material has a Young's modulus of greater than about 100,000 psi. but less than about 500,000 psi., the winding angle should be in a range of about 60 degrees to about 65 degrees. Thus, for reasons to be discussed, there is a direct relation between filament lay angle and matrix material Young's modulus, the lower the Young's modulus of the matrix composition, the smaller the lay angle should be in the aforementioned range, and the larger the Young's modulus of the matrix material, the larger the lay angle should be within the aforementioned range.

Figures 5A, 5B, 5C, 5D:
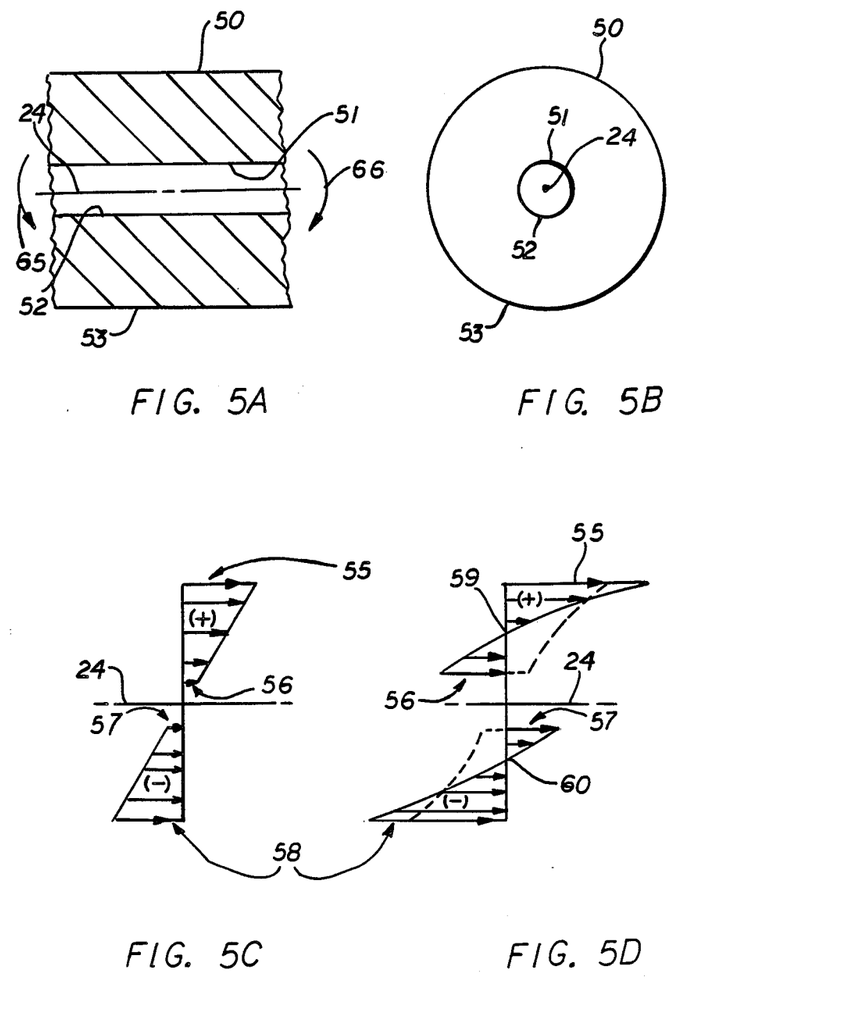
FIG. 5A is a longitudinal sectional view of a fragment of a tubular member, an end view which is illustrated in FIG. 5B.
FIG. 5C is a diagram illustrating the axial distribution of stresses in the shaft illustrated in FIG. 5A when fabricated of an isotropic material and subjected to the bending moments indicated by the arrows in FIG. 5A.
FIG. 5D is a diagram, similar to the diagram of FIG. 5C, but illustrating the axial distribution of stresses when the shaft is fabricated of anisotropic materials of conventional wound composite construction and subjected to the bending moments indicated by the arrows in FIG. 5A.
Figure 6:
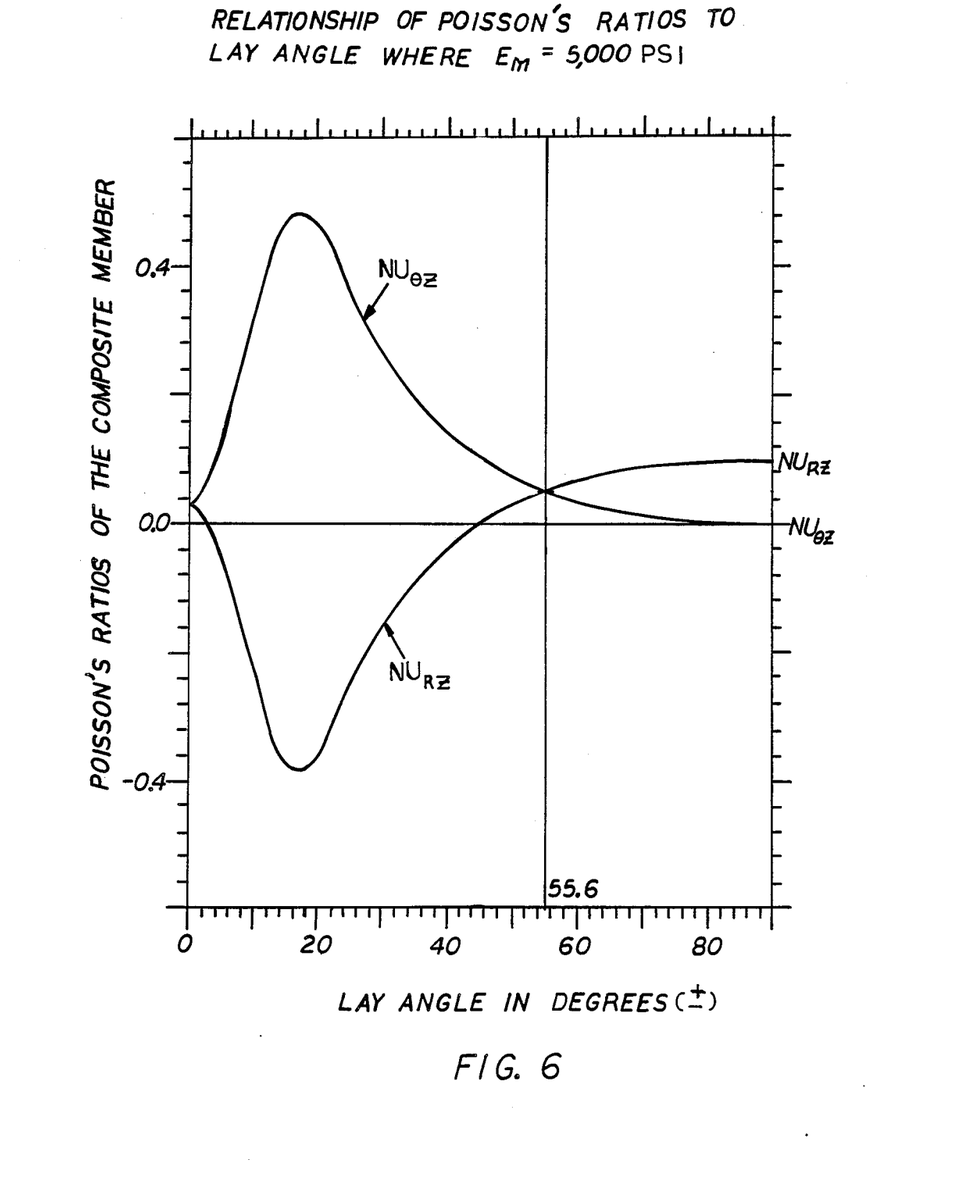
FIGS. 6, 7, 8 and 9 are graphs illustrating the relation between filament lay angles in degrees and circumferential and radial Poisson's ratios for a composite member comprising filaments bonded together by matrix materials of different Young's modulii.
Figure 7:
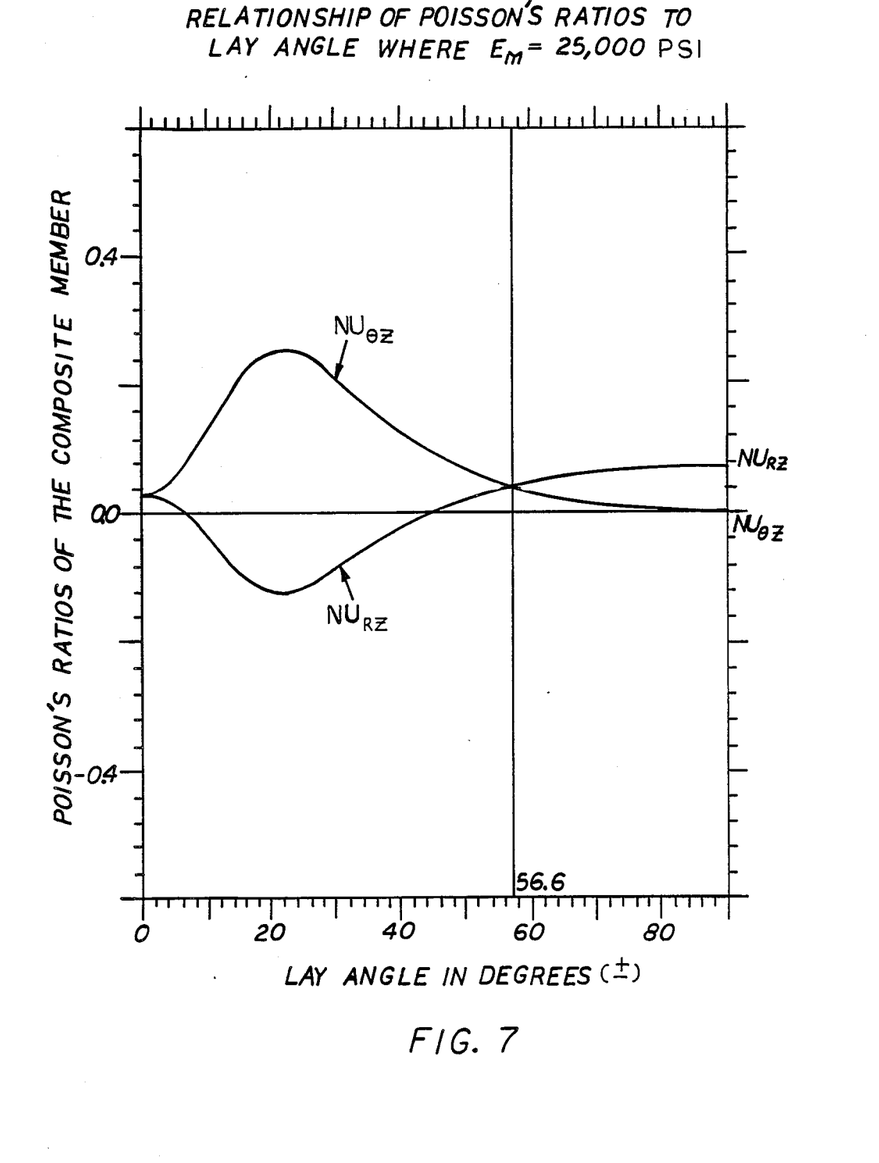
Figure 8:
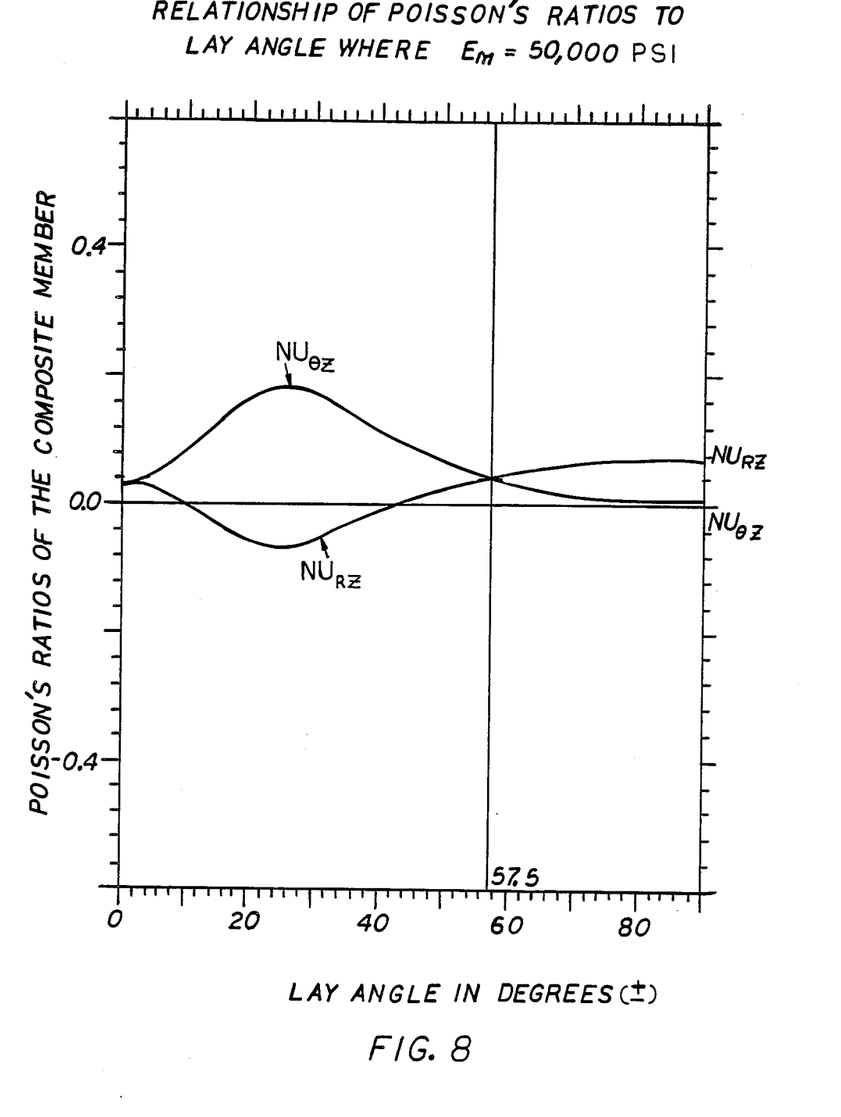
Figure 9:
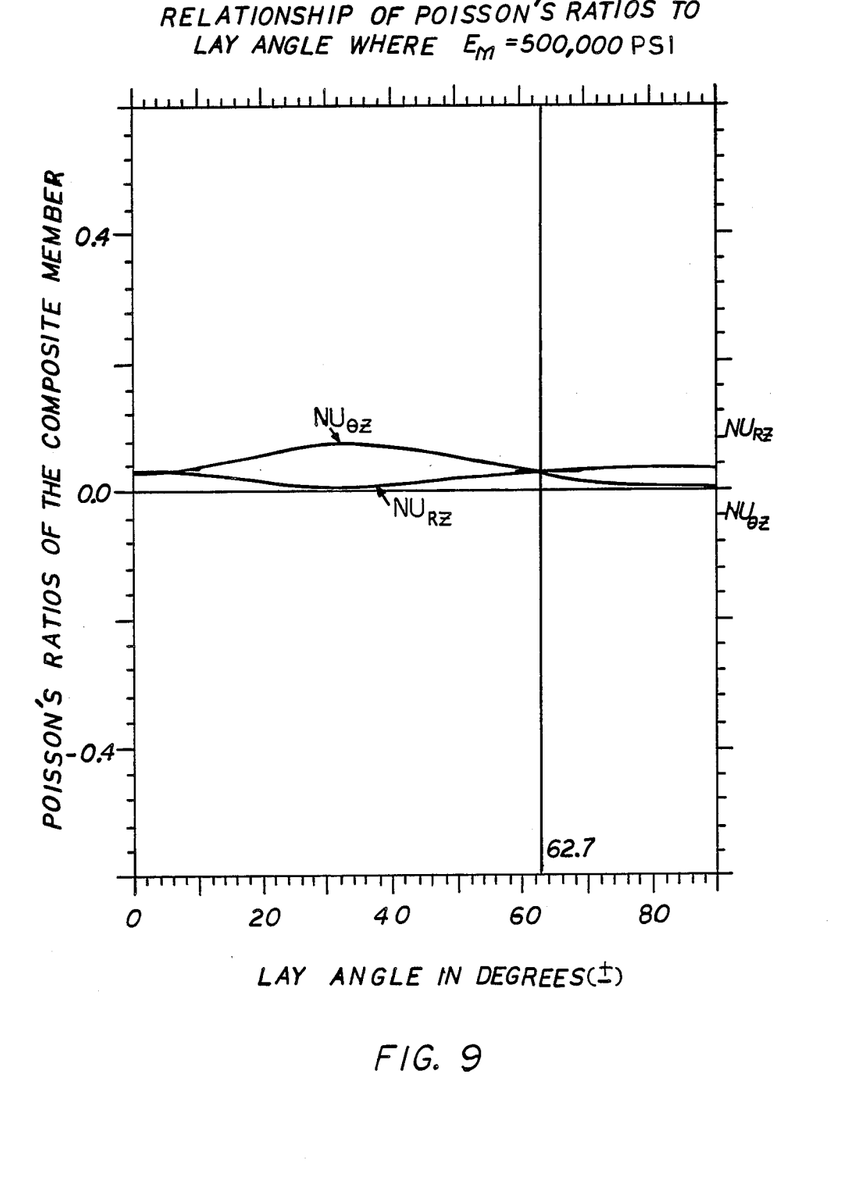

As an aid to understanding the theory by which the present invention functions to achieve its intended result, reference is made to FIGS. 5A-5D. FIG. 5A illustrates a longitudinal cross-sectional fragment of a tubular shaft of isotropic material having an elongate central axis 24. The shaft has an outer cylindrical surface denoted by the upper and lower reference lines 50 and 53, and the shaft has an inner cylindrical surface denoted by the reference lines 51 and 52, respectively. See FIG. 5B. When the shaft section illustrated in FIG. 5A is subjected to the bending moments indicated by the arrows 65 and 66, certain axial stress distribution patterns will result. These stress distribution patterns are dependent upon the nature of the composition of the shaft. For instance, when the shaft is of isotropic material, the axial stress distribution in the upper fibers (between the lines 51 and 50) is of a tensile nature and is substantially linear, as indicated by the vectors between the zones 56 and 55 in FIG. 5C, and the axial stress distribution in the lower fibers are linear and compressive as indicated between the vectors 57 and 58. Thus, in a shaft of isotropic material, the bending stresses are either all tensile or all compressive on each side of the longitudinal axis 24.

When the shaft section illustrated in FIGS. 5A and 5B is of conventional filament wound composite construction, wherein the filaments are disposed at the customary 45 degree angle with respect to the longitudinal axis 24, non-linear axial stress distribution patterns occur when the moments 65 and 66 are applied. When the matrix material is of relatively stiff composition, such as epoxy, a non-linear axial stress distribution pattern, such as indicated by the phantom lines in FIG. 5D, results upon imposition of the bending moments 65 and 66. However, when the composition of the matrix material is of a flexible material, such as polyurethane, not only is the axial stress distribution pattern non-linear, but both tensile and compressive axial stresses exist on both sides of the longitudinal axis 24 of the shaft. Thus, as illustrated in FIG. 5D, the curved stress distribution lines 59 and 60 extend between maximum tensile stresses in the upper outer fibers as indicated by the reference numeral 55 to maximum compressive stresses in the inner fibers as indicated by the reference line 56 in the upper wall of the shaft. A similar distribution of equal but opposite tensile stresses exist in the lower wall portion of the shaft section. As a result of these axial bending-induced stress distributions, the maximum stresses in the upper and lower outer fibers 55 and 58, respectively, are much larger than they would be if the shaft were of isotropic construction. As a result, a composite shaft having filaments wound at a 45 degree angle and using a flexible matrix must be overdesigned for a particular application resulting in inefficient use of material and increased weight.

The technical significance of the present invention can best be appreciated by comparing test results on identical shafts wherein the only difference between the shafts was in the lay angle of the filaments. To this end, a filament wound composite shaft having an outside diameter of 1.545 inches, an inside diameter of 1.245 inches, and length of 11.5 inches and having a fiber volume of approximately 50% was bent through an angle of 7.15 degrees between ends, and while thus bent subjected to a torque load. The filaments were of glass having a Young's modulus of $12 \times 10^6$ psi. and a Poisson's ratio of 0.1786. The matrix was a polyurethane having a Young's modulus of 20,000 psi. and a Poisson's ratio of 0.49065. Torque was applied to the thus bent shaft until failure occurred. The shaft having filaments wound at a 45 degree lay angle failed at an applied torque of 3,400 inch pounds. The shaft of the present invention, however, having filaments wound at a lay angle of 56 degrees, failed at an applied torque of 4,300 inch pounds. Thus, the shaft of the present invention had a 26% greater torque carrying capability than a shaft of conventional construction.

By way of further example, shafts constructed in accordance with the teachings of the present invention have been compared with shafts of conventional construction and the results set forth in Tables 1 and 2. Each shaft compared had an outside radius of 1.05 inches, an inside radius of 0.9 inches, and was composed of glass fibers having a Young's modulus of $12 \times 10^6$ psi., a Poisson's ratio of 0.1786. The filaments provided a fiber volume fraction of 50%. The filaments were wound at angles $a_1$ and $a_2$ of 45 degrees with respect to the longitudinal axis of the shaft. The shaft had a length of 40 inches and was mounted cantilever at one end. The stresses at the inner and outer surfaces of the shaft were determined at 10 inches from the point of application of a transverse load of 10 pounds at the free end of the shaft.

The shafts were of identical construction except for the composition of the matrix materials. Several different matrix materials were used. For instance, the matrix materials included a flexible polyurethane having a Young's modulus of 5,000 psi., a less flexible polyurethane having a Young's modulus of 25,000 psi., and a stiff epoxy resin having a Young's modulus of 500,000 psi.

The results of the referenced tests on shafts of conventional construction are set forth in Table 1 below.

TABLE 1

| | | | 5,000 | 25,000 | 500,000 |
|---|---|---|---|---|---|
| Matrix Modulus $E_m$ (psi) | | | | | |
| Ratio of Torsional Shear Modulus $G_{\theta z}$ and Young's Modulus $E_z$ of Composite Member | | | 24.4 | 5.26 | 1.07 |
| BENDING NORMAL STRESSES (psi) | OUTER SURFACE | Linear (minimum) | ±239 | ±239 | ±239 |
| | | Actual | ±580 | ±305 | ±247 |
| | | Increase % | 143 | 28 | 3 |
| | INNER SURFACE | Linear (minimum) | ±204 | ±204 | ±204 |
| | | Actual | ±170* | ±132 | ±196 |
| | | Increase % | 183 | 35 | 4 |
| MAXIMUM BENDING SHEAR STRESSES (PSI) | Minimum | | 21.7 | 21.7 | 21.7 |
| | Actual | | 122 | 44 | 30 |
| | Increase % | | 462 | 103 | 38 |

*Note the reversal of the sign of the stress on the inner surface for $E_m = 5,000$ psi From Table 1, it may be observed that composite shafts having filaments wound at a 45 degree lay angle with very flexible matrix compositions exhibit significant increases in bending stresses at their outer and inner surfaces (50 and 51-FIG. 5A) relative to the linear stresses for an isotropic shaft of the same configuration.

The aforementioned stress variation is believed to be caused by the difference between radial and circumferential strains in the shaft when the shaft is strained axially. These strains may be expressed in terms of Poisson's ratios in the circumferential and radial directions. For example, the radial Poisson's ratio is calculated by dividing the strain in the radial direction by the strain in the axial direction. The circumferential Poisson's ratio is calculated by dividing the strain in the circumferential direction by the strain in the axial direction. A negative sign convention is used in this calculation. When these two ratios are substantially equal, bending stresses in the shaft are minimized resulting in a substantially linear axial stress distribution similar to that found for isotropic materials.

For flexible matrix materials, i.e. those having Young's modulus below about 100,000 psi., it has been determined that the critical filament lay angle should be in a range of between about 55 degrees to about 60 degrees. For shafts fabricated of more flexible matrix materials, i.e. those having a Young's modulus of up to about 50,000 psi., the lay angle should be approximately 57.5 degrees. For shafts fabricated of even more flexible matrix materials, i.e. those having a Young's modulus of about 5,000 psi., the lay angle should be about 55.6 degrees. For shafts fabricated of stiff matrix materials, such as epoxy compositions having a Young's modulus of up to about 500,000 psi., the lay angle should be above about 60 degrees, but less than about 65 degrees, and preferably about 62.7 degrees.

Shafts constructed in accordance with the teachings of the present invention have been built and analyzed for stresses. The shafts were built in the same manner as described above with respect to the shafts built to provide the data of Table 1. The results of the analysis are set forth below in Table 2.

TABLE 2

| | | | | |
|---|---|---|---|---|
| Matrix Modulus (psi) | | 5,000 | 25,000 | 500,000 |
| Angle $\alpha_1$, $\alpha_2$ (FIG. 2) | | ±55.6 | ±55.6 | ±62.7 |
| Ratio of torsional Shear Modulus $G_{\theta z}$ and Youngs Modulus $E_z$ of Composite Member | | 29.8 | 6.8 | 1.0 |
| BENDING NORMAL STRESSES | OUTER SURFACE | ±238 | ±238 | ±239 |
| | INNER SURFACE | ±206 | ±206 | ±205 |
| BENDING SHEAR STRESS | ACTUAL (psi) | 62 | 29 | 22 |
| | REDUCTION (from ±45°) | 50% | 34% | 27% |

From Table 2 it may be observed that when compared with the shafts wound at a 45 degree lay angle, shafts of low-modulus matrix compositions wound in accordance with the present invention exhibit a reduction of 50% in the bending shear stresses without the torsional stiffness to bending stiffness ratio being significantly adversely affected, as indicated by the ratio of torsional shear modulus to Young's modulus set forth in the Tables. The lay angles are critical, and they depend predominantly on the properties of the composition of the matrix materials.

The ultimate torsional buckling load is higher for shafts having filaments wound at lay angles in a range of 55.5 degrees to about 57.5 degrees, because buckling torque is proportional to the circumferential modulus $E_\theta$ of the shaft, and such modulus is higher for filament lay angles in the 55 degree through 57 degree range than for lay angles of about 45 degrees.

According to one preferred embodiment of the present invention, a composite filament wound shaft should have a high torsional stiffness to bending stiffness ratio, the composition of the matrix material should be flexible (i.e. having a Young's modulus of less than about 100,000 psi.); the filaments should be of stiff material, such as glass; and the filaments should be wound at lay angles $\alpha_1$ and $\alpha_2$ in a range of about 55 degrees to about 60 degrees, and more preferably in a range of about 55.6 degrees to about 59.5 degrees to minimize stresses due to bending. Lay angles of about 55.6 degrees should be used for very flexible matrix materials having Young's modulus of about 5,000 psi., and lay angles of about 59.5 degrees should be used for flexible matrix materials having a Young's modulus approaching 100,000 psi.

Figure 4:
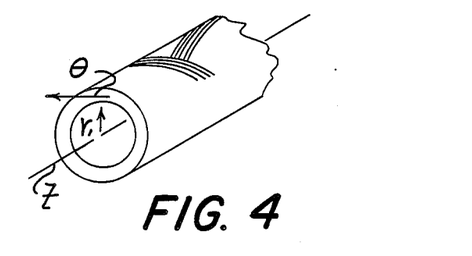
FIG. 4 is a fragmentary perspective view of the shaft illustrated in FIG. 1 illustrating certain reference datums.

It is possible precisely to determine the best lay angle within the aforementioned ranges for a range of matrix materials. The computational process includes the following steps wherein:

E represents Young's modulus
NU represents Poisson's ratio
G represents shear modulus
r, z and $\theta$ are the directions indicated in FIG. 4
L is a direction coaxial with the filaments where $T_1$ and $T_2$ are directions orthogonal to L, and for most composites, $T_1$ and $T_2$ are equal.

I. Compute selected properties of a uniaxial composite layer which are functions of matrix and fiber properties including longitudinal Young's modulus ($E_L$), transverse Young's modulus ($E_T$), longitudinal Poisson's ratio ($NU_{TL}$), transverse Poisson's ratio ($NU_{TT}$), longitudinal shear modulus ($G_{LT}$) and transverse shear modulus ($G_{TT}$) in accordance with methods known to those skilled in the art. For example, the work of Z. Hashin in the September 1979 *Journal of Applied Mechanics*, Volume 46/543-550 sets forth relations for various elastic constants by using minimum potential energy to determine upper bounds and minimum complementary energy to determine lower bounds. Empirical factors which modify Hashin's expressions for $G_{LT(-)}$ and average of $E_{T(-)}$ and $E_{T(+)}$ are identified in paragraphs (4) and (12) hereinafter. By using these empirical factors this method of calculation is extended to the more flexible matrix materials of particular applicability in the present invention.

Lower Bounds on Axial Constants $$E_{L(-)} = E_f V_f + E_m V_m + \frac{4(NU_f - NU_m)^2 V_f V_m}{(V_f/K_m + V_m/K_f + 1/G_m)} \quad (1)$$

$$NU_{TL(-)} = NU_f V_f + NU_m V_m + \quad (2)$$

$$\frac{(NU_m - NU_f)(1/K_f - 1/K_m)V_f V_m}{(V_f/K_m + V_m/K_f + 1/G_f)}$$

for $(NU_m - NU_f)/(K_f - K_m) > 0$, or $$Nu_{TL(-)} = NU_f V_f + NU_m V_m + \quad (3)$$

$$\frac{(NU_f - NU_m)(1/K_m - 1/K_f) \times V_m V_f}{(V_f/K_m + V_m/K_f + 1/G_m)}$$

for $(NU_m - NU_f)/(K_f - K_m) < 0$, and $$G_{LT(-)} = \frac{G_m(G_m V_m + G_f(1 + V_f))}{G_m(1 + V_f) + G_f V_m}$$

Modified $G_{LT} = G_{LT(-)} \cdot \frac{1}{(0.369183 + 0.37266 \times 10^{-5} \times E_m)} \quad (4)$ Upper Bounds on Axial Constants $$E_{L(+)} = E_f V_f + E_m V_m + \frac{4(NU_m - NU_f)^2 V_f V_m}{(V_f/K_m + V_m/K_f + 1/G_f)} \quad (5)$$

$$NU_{TL(+)} = NU_f V_f + NU_m V_m + \quad (6)$$

$$\frac{(NU_f - NU_m)(1/K_m - 1/K_f)V_m V_f}{(V_f/K_m + V_m/K_f + 1/G_m)}$$

for $(NU_m - NU_f)/(K_f - K_m) > 0$.

or $$NU_{TL(+)} = NU_f V_f + NU_m V_m + \quad (7)$$

$$\frac{(NU_m - NU_f)(1/K_f - 1/K_m) V_f V_m}{(V_f/K_m + V_m/K_f + 1/G_f)}$$

for $(NU_m - NU_f)/(K_f - K_m) < 0$, and $$G_{LT(-)} = \frac{G_f(G_f V_f + G_m(1 + V_m))}{(G_f(1 + V_m) + G_m V_f)} \quad (8)$$

Transverse Constants $$G_{TT(-)} = G_m + \frac{V_f}{\frac{1}{G_f - G_m} + \frac{(K_m + 2G_m) V_m}{2G_m(K_m + G_m)}} \quad (9)$$

-continued $$G_{TT(+)} = G_m \left( 1 + \frac{(1 + \text{beta}_m)V_f}{\text{Rho} - V_f \left( 1 + \frac{3\text{beta}_m^2 V_m^2}{(\text{alpha}V_f^3 + 1)} \right)} \right) \quad (10)$$

$$E_{T(\pm)} + \frac{4K_{(\pm)}G_{TT(\pm)}}{K_{(\pm)} + M_{(\pm)}G_{TT(\pm)}} \quad (11)$$

Modified $$E_T = \left( \frac{E_{T(+)} + E_{T(-)}}{2} \right) \cdot (3.34186(E_m) - 0.0924094) \quad (12)$$

and $$NU_{TT(\pm)} = \frac{K_{(\pm)} - M_{(\pm)}G_{TT(\mp)}}{K_{(\pm)} + M_{(\pm)}G_{TT(\mp)}} \quad (13)$$

where $$K_m = \frac{E_m}{2(1 + NU_m)(1 - 2NU_m)}$$

$$K_f = \frac{E_f}{2(1 + NU_f)(1 - 2NU_f)}$$

$$G_m + \frac{E_m}{2(1 + NU_m)}$$

$$G_f + \frac{E_f}{2(1 + NU_f)}$$

$$K(-) = K_m + \frac{V_f}{\frac{1}{(K_f - K_m)} + \frac{V_m}{(K_m + G_m)}}$$

$$K(+) = K_f + \frac{V_m}{\frac{1}{(K_m - K_f)} + \frac{V_f}{(K_f + G_f)}}$$

$$M(\pm) = 1 + \frac{4K_{(\pm)}NU_{TL(\mp)}^2}{E_{L(\pm)}}$$

$$\text{beta}_m = \frac{K_m}{K_m + 2G_m}$$

$$\text{beta}_f = \frac{K_f}{K_f + 2G_f}$$

$$\text{gamma} + G_f / G_m$$

$$\text{alpha} + \frac{\text{beta}_m - \text{gamma} \cdot \text{beta}_f}{1 + \text{gamma} \cdot \text{beta}_f} \text{ and}$$

$$\text{Rho} = \frac{\text{gamma} + \text{beta}_m}{\text{gamma} - 1} \quad (14)$$

$V_f$=Fiber Volume Fraction
$V_m$=Matrix Volume Fraction
m and f subscripts refer to matrix and fiber materials.

These properties, as is evident, depend on matrix material and filament material properties, the fiber volume fraction, and the winding angle plus $(\alpha_1)$ and minus alpha$(\alpha_2)$.

II. Compute selected properties of an angle ply laminate made of several even number of uniaxial composite layers wound alternately at plus alpha and minus alpha with respect to the axis of the shaft, in the axis system of the shaft (r, z, $\theta$). The selected properties include axial Young's modulus $E_z$, radial Young's modulus $E_r$, circumferential Young's modulus $E_\theta$, Poisson's ratio $NU_{r\theta}$ (in the plane of r and $\theta$ axes), radial Poisson's ratio $NU_{rz}$ (in the plane of r and z axes), circumferential Poisson's ratio $NU_{\theta z}$ (in the plane of $\theta$ and z axes), shear modulus $G_{r\theta}$ (in the plane of r and $\theta$ axes), shear modulus $G_{rz}$ (in the plane of r and z axes), and shear modulus $G_{\theta z}$ (in the plane of $\theta$ and z axes). This is done by the following process:

(a) Compute $[\overline{C}] = [\overline{T}]^T[C][\overline{T}]$ where,
$[\overline{C}]$=material stiffness matrix in the r, z, $\theta$ system, rotated at plus or minus alpha angles.
$[C]$=material stiffness matrix in the material axes 1 and t system of the layer.
$[\overline{T}]$=modified transformation matrix=$[P]^1[T][P]$,
$[T]$=transformation matrix, where $$[T] = \begin{bmatrix} l_1^2 & l_2^2 & l_3^2 & 2l_1l_2 & 2l_1l_3 & 2l_2l_3 \\ m_1^2 & m_2^2 & m_3^2 & 2m_1m_2 & 2m_1m_3 & 2m_2m_3 \\ n_1^2 & n_2^2 & n_3^2 & 2n_1n_2 & 2n_1n_3 & 2n_2n_3 \\ l_1m_1 & l_2m_2 & l_3m_3 & (l_1m_2 + l_2m_1) & (l_1m_3 + l_3m_1) & (l_2m_3 + l_3m_2) \\ l_1n_1 & l_2n_2 & l_3n_3 & (l_1n_2 + l_2n_1) & (l_1n_3 + l_3n_1) & (l_2n_3 + l_3n_2) \\ m_1n_1 & m_2n_2 & m_3n_3 & (m_1n_2 + m_2n_1) & (m_1n_3 + m_3n_1) & (m_2n_3 + m_3n_2) \end{bmatrix}$$

where
$l_i$=cos (L, $x_i$)
$m_i$=cos ($T_1$, $x_i$)
$n_i$=cos ($T_2$, $x_i$)
where
$1=1, 2, 3$
$l_1$=cos (L, $x_1$)  $l_2$=cos (L, $x_2$)
$l_3$=cos (L, $x_3$)
similarly $m_i$ and $n_i$ are described.
and
$x_1=r$
$x_2=z$
$x_3=\theta$
and $$[P] = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & \frac{1}{2} & 0 & 0 \\ 0 & 0 & 0 & 0 & \frac{1}{2} & 0 \\ 0 & 0 & 0 & 0 & 0 & \frac{1}{2} \end{bmatrix}$$

(b) Compute $[\overline{C}]$ for each layer (e) All of the stiffness matrices thus obtained are then combined to give an equivalent material stiffness matrix of the shaft material in the r, z, $\theta$ system; by using $$[C]_e = (1/t)[[A]-[B][D]^{-1}[B]]$$

where, t = thickness of the tube,
$[A] = [Aij]$,
$[B] = [Bij]$,
$[C] = [Cij]$, $$A_{ij} + \sum_{k=1}^{N} (C_{ij})_k t_k,$$

$$B_{ij} = \sum_{k=1}^{N} (C_{ij})_k t_k Z_k,$$

$$D_{ij} = \sum_{k=1}^{N} (C_{ij})_k (t_k Z_k^2 + t_k^3/12)$$

$z_k$ is distance from the center of the thickness of the composite member to the layer k
$t_k$ is the thickness of the layer k
k is the layer number in the laminate
i = r, z or $\theta$
j = r, z or $\theta$
N = the total number of layers in the laminate
(d) Compute the compliance matrix, $[S]_e = [C]_e^{-1}$, where, $$[S]_e = \begin{bmatrix} S_{rr} & S_{rz} & S_{r\sigma} & 0 & 0 & 0 \\ S_{rz} & S_{zz} & S_{z\sigma} & 0 & 0 & 0 \\ S_{r\sigma} & S_{z\sigma} & S_{\sigma\sigma} & 0 & 0 & 0 \\ 0 & 0 & 0 & G_{rz} & 0 & 0 \\ 0 & 0 & 0 & 0 & G_{r\sigma} & 0 \\ 0 & 0 & 0 & 0 & 0 & G_{z\sigma} \end{bmatrix}$$

(e) Compute the engineering constants of the material of the shaft laminate by using:

$$E_r = 1/S_{rr}, \ E_z = 1/S_{zz}, \ E_\theta = 1/S_{\theta\theta}, \text{ and}$$

$$NU_{rz} = -S_{rz}/S_{zz}, \ NU_{r\theta} = -S_{r\theta}/S_{\theta\theta},$$
$$NU_{\theta z} = -S_{\theta z}/S_{zz}$$

III. Next, compute the critical winding angle, plus and minus alpha, at which $NU_{rz}$ and $NU_{\theta z}$ are equal by iterative calculations from $+0°$ to $+90°$ winding angle by using proper increments in the values of + angle, i.e. 10° for a first iteration, 1° for a second iteration and 0.1° for a final iteration, in accordance with iteration techniques well known in the art.

IV. The bending stresses are then calculated for a given shaft, for the critical winding angle, by using the results obtained above. These stresses may be determined by using a variety of conventional analytical techniques, such as: a finite element program, or a closed form solution.

In view of the foregoing, it should be apparent that the present invention now provides an improved composite shaft of filament wound construction which is both torsionally stiff and flexible yet which has minimum bending stresses. The shaft is particularly useful in those applications where high torque transmission is required between couplings that may be rotatable about misaligned axes. The shaft is especially useful in modern aircraft, automobile power trains, and biomedical applications such as bone reamers.

While preferred embodiments of the present invention have been described in detail, various modifications, alterations and changes may be made without departing from the spirit and scope of the present invention as defined in the appended claims.

I claim:

1. In a composite elongate member for use in transmitting torque between juxtaposed elements rotatable about axes that may be misaligned, the member including a series of pairs of overlapped anisotropic layers bonded together circumferentially about a longitudinal axis with each layer pair comprising substantially parallel filaments bonded together by a matrix material, the filaments in each layer pair being disposed at a predetermined lay angle with respect to said longitudinal axis, the lay angle of the filaments in adjacent layers of each pair being substantially equal in magnitude with one another but opposite in direction with respect to said longitudinal axis so that filaments in adjacent layers of each pair cross one another, the improvement wherein said lay angle of at least one of said pairs of layers is preselected with respect to the stiffness of the matrix material so that the strain in the member in the circumferential direction is substantially equal to the strain in the member in the radial direction when the member is subjected to strain in the axial direction, whereby the bending stress in the composite member is at a minimum while the ratio of torsional stiffness to bending stiffness of the member is not adversely affected.

2. A composite member according to claim 1 wherein the magnitude of said lay angle is directly related to the magnitude of the Young's modulus of the matrix material with the lay angle magnitude being larger at matrix material Young's moduli approaching 500,000 psi. and being smaller at matrix material Young's moduli approaching 5,000 psi.

3. A composite member according to claim 2 wherein said matrix material Young's modulus is in a range of about 100,000 psi. to about 500,000 psi. and said lay angle is in a range of about 60 degrees to about 65 degrees.

4. A composite member according to claim 3 wherein said matrix material is an epoxy.

5. A composite member according to claim 2 wherein said matrix material Young's modulus is in a range of about 5,000 psi. to about 100,000 psi. and said lay angle is in a range of about 55 degrees to about 60 degrees.

6. A composite member according to claim 5 wherein said matrix material is a polyurethane.

7. A composite member according to claim 2 wherein said lay angle is in a range of about 55 degrees to about 65 degrees.

8. A composite member according to claim 1 wherein said filaments are of a high modulus material selected from the group consisting of: carbon, boron, glass, graphite, polyamide and steel.

9. A composite member according to claim 1 wherein the Poisson's ratio of the member in the radial direction is equal to the Poisson's ratio of the member in the circumferential direction.

10. A composite member according to claim 1 wherein said lay angle is in a range of about 55 degrees to about 65 degrees.

11. In a composite elongate member for use in transmitting torque between juxtaposed elements rotatable about axes that may be misaligned, the member including a series of basis of overlapped anisotropic layers bonded together circumferentially about a longitudinal axis with each layer pair comprising substantially parallel filaments bonded together by a matrix material, the filaments in each layer pair being disposed at a predetermined lay angle with respect to said longitudinal axis, the lay angle of the filaments in adjacent layers of each pair being substantially equal in magnitude with one another but opposite in direction with respect to said longitudinal axis so that filaments in adjacent layers of each pair cross one another, the improvement wherein said matrix material is flexible and has a Young's modulus of less than about 100,000 psi., and said filament lay angle of at least one of said pairs of layers is in a range of between about 55 degrees to about 60 degrees and is preselected within said range with respect to the stiffness of the matrix material so that the strain in the member in the circumferential direction is substantially equal to the strain in the member in the radial direction when the member is subjected to strain in the axial direction, whereby the bending stress in the composite member is at a minimum while the ratio of torsional stiffness to bending stiffness of the member is not adversely affected.

12. In a composite elongate member for use in transmitting torque between juxtaposed elements rotatable about axes that may be misaligned, the member including a series of basis of layers overlapped anisotropic layers bonded together circumferentially about a longitudinal axis with each layer pair comprising substantially parallel filaments bonded together by a matrix material, the filaments in each layer pair being disposed at a predetermined lay angle with respect to said longitudinal axis, the lay angle of the filaments in adjacent layers being substantially equal in magnitude with one another but opposite in direction with respect to said longitudinal axis so that filaments in adjacent layers of each pair cross one another, the improvement wherein said matrix material is stiff and has a Young's modulus in excess of about 100,000 psi., and said filament lay angle of at least one of said pairs of layers is in a range of between about 60 degrees to about 65 degrees and is preselected in said range with respect to the stiffness of the matrix material so that the strain in the member in the circumferential direction is substantially equal to the strain in the member in the radial direction when the member is subjected to strain in the axial direction, whereby the bending stress in the composite member is at a minimum while the ratio of torsional stiffness to bending stiffness of the member is not adversely affected.

* * * * *